United States Patent [19]

Maringer et al.

[11] Patent Number: 4,548,969

[45] Date of Patent: Oct. 22, 1985

[54] CROSS-LINKABLE ROTATIONAL MOLDING COMPOSITIONS

[76] Inventors: Melvin F. Maringer, Cincinnati, Ohio; Fred K. Morgan, Cold Springs, Ky.

[21] Appl. No.: 497,313

[22] Filed: May 23, 1983

[51] Int. Cl.$^4$ ................................................ C08F 8/00
[52] U.S. Cl. ...................... 524/94; 524/111; 524/371; 524/529; 525/275
[58] Field of Search ............ 524/94, 111, 371, 529; 525/275

[56] References Cited

U.S. PATENT DOCUMENTS

| | | | |
|---|---|---|---|
| 3,802,913 | 4/1974 | MacKenzie, Jr. ................. | 427/120 |
| 3,876,613 | 4/1975 | Needham et al. .................. | 524/307 |
| 3,901,863 | 8/1975 | Berger et al. ...................... | 526/114 |
| 4,029,729 | 6/1977 | Rees et al. ......................... | 526/228 |
| 4,326,988 | 4/1982 | Welch et al. ...................... | 526/114 |
| 4,328,121 | 5/1982 | Capshew ........................... | 526/124 |
| 4,394,291 | 7/1983 | Hawley ............................. | 526/119 |

*Primary Examiner*—Bernard Lipman
*Attorney, Agent, or Firm*—Kenneth D. Tremain

[57] ABSTRACT

Ethylene homopolymers and copolymers of ethylene and $C_3$–$C_8$ acylic alpha-olefins prepared with a catalyst comprising the reaction product of a metal organic oxygenated compound, a transition metal organic oxygenated compound and an aluminum halide can be combined with acetylenic high molecular weight diperoxy hexynes or octynes and crosslinked during rotational molding.

18 Claims, No Drawings

CROSS-LINKABLE ROTATIONAL MOLDING COMPOSITIONS

BACKGROUND OF THE INVENTION

1. Field of the Invention

This invention relates to a cross-linkable rotational molding composition, to a method of rotational molding and to rotational molded articles. More particularly, it relates to an ethylene homopolymer or copolymer composition which can be cross-linked during rotational molding. This invention especially relates to a cross-linkable and rotationally moldable ethylene homopolymer or copolymer prepared in the presence of a particular solid polymerization catalyst complex.

2. Description of the Prior Art

Ethylene homopolymer and copolymers are fabricated into useful articles by a variety of techniques including blow molding, injection molding and rotational molding. Rotational molding (also called rotomolding) can be employed to produce hollow items of almost any size, open or closed and of any desired shape. Rotational molding techniques have been highly developed in recent years so that the production of many items by rotational molding can compete with those produced by blow molding, injection molding and thermoforming. In many cases, articles virtually impossible to fabricate by any of these other techniques can be produced by rotational molding. The main differences between rotational molding and other molding techniques, such as blow and injection molding, are (a) the use of resin powder instead of pellets, (b) the fact that the resin melts in the molds instead of being forced under pressure into the molds in a molten state, (c) biaxial rotation of the mold, and (d) the comparatively very low mold cost. Rotational molding molds are inexpensive because of their simplicity due to the lack of pressure in processing and of coring for water cooling.

In rotational molding, a charge of powdered thermoplastic material is placed inside a hollow mold. The mold and charge are rotated on two axes at predetermined speed ratios while the whole is heated to the melting point of the plastic. The melted plastic is distributed throughout the mold to produce a complete article. The mold is then cooled, solidifying the plastic and finally, the molded part is unloaded.

All thermoplastic resins can be used in rotational molding; polyethylene is the most widely used polymer but others including ethylene copolymers such as ethylene-vinyl acetate are gaining in use. U.S. Pat. No. 3,974,114 of Sowa discloses that additions of fatty acid salts, such as calcium or lithium stearate, to olefin polymer-based rotational molding compositions provide rotational moldings with pinhole-free surfaces. U.S. Pat. No. 3,627,869 of Walton discloses a method of producing a rotational molded product having good environmental stress crack resistance (ESCR) by forming a laminate of an ethylene homopolymer or copolymer and a copolymer of ethylene and propylene. U.S. Pat. Nos. 3,876,613 of Needham et al. and 4,029,729 of Rees et al. teach that ethylene polymers can be cross-linked during rotational molding by adding effective amounts of the acetylenic diperoxy hexynes or octynes of U.S. Pat. No. 3,214,422 of Mageli et al. The molding compositions disclosed by Needham et al additionally include an antioxidant of an ester of thiodipropionic acids which does not have a negative effect on the low temperature impact strength of the molded article as do other antioxidants. Both Needham et al. and Rees et al. employ ethylene polymers having a melt index of at least about 10 prepared by any suitable method including solution polymerization with chromium oxide-based catalysts. A useful rotational molding composition is disclosed in U.S. Pat. Nos. 4,032,600 and 4,185,067 of MacAdams et al which is said to provide molded articles of high impact resistance, high stress crack resistance, with smooth surfaces and an absence of excessive warpage. This composition is a blend of three polymers: high density ethylene homopolymer or copolymer, a random copolymer or terpolymer of ethylene and propylene and a copolymer of ethylene and vinyl acetate.

Most cross-linkable ethylene polymers employed heretofore in commercial rotational molding compositions have been prepared by solution polymerization techniques. Although ethylene polymers prepared by particle form polymerization are available and are less costly than those prepared by solution polymerization they have not been available heretofore in a form whereby they may be cross-linked during rotational molding.

It is an object of this invention to provide a crosslinkable rotomolding composition utilizing a particle form ethylene polymer.

It is another object of this invention to provide a method of rotational molding to produce an article of a cross-linked particle form ethylene polymer.

It is a further object of this invention to provide a rotomolded article of a cross-linked ethylene polymer prepared by particle form polymerization.

The achievement of these and other objects will be apparent from the following description of the subject invention.

SUMMARY OF THE INVENTION

In accordance with the present invention, it has been found that ethylene polymers prepared with a catalyst comprising the reaction product of a metal organic oxygenated compound, a transition metal organic oxygenated compound and an aluminum halide can be crosslinked during rotational molding. Prior art ethylene polymers prepared with a catalyst comprising the reaction product of a metal organic oxygenated compound and a transition metal halide do not crosslink during rotational molding.

In particular, this invention relates to an ethylene polymer composition capable of being cross-linked during rotational molding which comprises:

(a) a linear polymer of ethylene having a density of above about 0.94, said polymer having been prepared in the presence of a catalyst composition comprising:
  (i) the solid reaction product of (1) at least one non-halide containing organic oxygenated compound of a metal selected from the metals of Groups Ia, IIa, IIb, IIIa, IVa, VIIb and VIII of the Periodic Table, with (2) at least one nonhalide containing organic oxygenated transition compound of a transition metal selected from the metals of Groups IVb, Vb, and VIb of the Periodic Table, and with (3) an organo aluminum halide having the general formula $AlR_nR'_{3-n}$ in which R is a hydrocarbon radical containing 1 to 20 carbon atoms, R' is a halide and n is any number such that $1 \leq n \leq 2$; and
  (ii) an organo-metallic compound selected from the organic derivatives of metals of Groups Ia, IIa, IIb, IIIa and IVa of the Periodic Table, and, (b) a crosslinking effective amount of an acetylenic high molecular weight diperoxy compound selected from the group consisting of hexynes having the formula

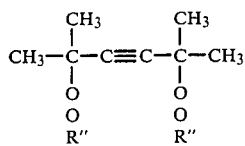

octynes having the formula

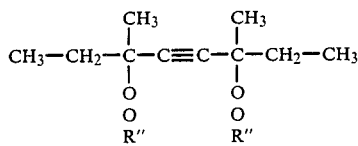

and octynes having the formula

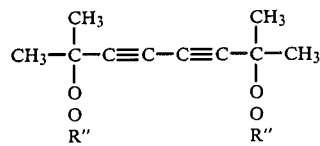

where R'' is selected from the group consisting of tertiary alkyl, alkyl carbonate and benzoate.

This invention also relates to the above ethylene polymer composition which additionally contains a flame retardant additive comprising an organic, heat-labile chlorine or bromine compound and, optionally, antimony oxide.

This invention additionally relates to a process of preparing a rotationally molded article utilizing either of the above subject ethylene polymer compositions.

This invention further relates to a rotationally molded article formed from either of the above subject ethylene polymer compositions.

DESCRIPTION OF THE PREFERRED EMBODIMENTS

The present invention relates to ethylene polymer compositions which may be cross-linked during roto-molding, to a process of preparing rotationally molded articles from these compositions and to the rotationally molded articles prepared from these compositions.

The ethylene polymers employed here are high density linear polymers. They may be either homopolymers of ethylene or copolymers containing at least 90 weight percent ethylene and at least one acyclic $C_3$–$C_8$ alpha olefin. Since the useful ethylene polymers must be crosslinkable, it has been found that ethylene polymers prepared by the process and in the presence of the catalyst disclosed in U.S. Pat. No. 3,901,863 of Berger et al. will have the requiste properties and may be employed in the rotomolding compositions of this invention. The entire contents of said patent of Berger et al are incorporated herein by reference.

The disclosure of this patent may be summarized as follows: The polymerization catalyst is a solid catalyst composition comprising a solid catalyst complex and an activator. The catalyst complex comprises the reaction product of a metal organic oxygenated compound, a transition metal organic oxygenated compound and an aluminum halide. The metal of the metal organic oxygenated compound is a metal of Groups Ia, IIa, IIb, IIIa, IVa, VIIb and VIII of the Periodic Table. (All references to the Periodic Table made herein are to the Periodic Table of the Elements appearing on the inside of the front cover of "Handbook of Chemistry and Physics", 62nd ed., 1981–1982, CRC Press Inc, Boca Raton, Fla.) Among these metals which may be mentioned by way of example, are lithium, sodium, potassium, magnesium, calcium, zinc, boron, aluminum, silicon, manganese, iron, nickel, cobalt, tin and the like. The divalent metals are preferred with magnesium being particularly preferred. The transition metal of the transition metal organic oxygenated compound is a transition metal of Groups IVb, Vb and VIb of the Periodic Table. Titanium, zirconium and vanadium are preferred with titanium being particularly preferred. Both the metal and the transition metal organic oxygenated compounds are compounds where the organic radical is attached to the metal via oxygen. Useful organic compounds include alkoxides, phenates and enolates with the alkoxides being preferred. The aluminum halide has the general formula $AlR_nR'_{3-n}$ where R is a hydrocarbon radical containing 1 to 20 carbon atoms, preferably 1 to 6 carbon atoms, R' is a halide and n is a number such that $1 \leq n \leq 2$. Preferred halides of aluminum include aluminium trichloride, ethyl aluminum dichloride and diethyl aluminium chloride. The complex is formed by reacting the three compounds together. Although the reaction may be conducted in a liquid diluent such as an alkane, a cycloalkane or an alcohol, it may also be carried out in a liquid medium, in the absence of a diluent, by selecting reaction conditions such that at least one of the reactants is in the liquid state. A reaction temperature between 20° and 300° C. is used. The ratio of reactants varies over a wide range, viz, between 0.01 and 10 gram atoms of transition metal present in the organic oxygenated transition compound per gram atom of metal present in the organic oxygenated compound and between 0.10 and 10 moles of aluminum halide per gram equivalent of metal and transition metal present in all of the organic oxygenated and organic oxygenated transition compounds used. The reaction products are obtained as solid catalyst complexes which are separated and washed to elminate excess reagents The activator employed with the solid reaction product is an organo-metallic compound of metals of Groups Ia, IIa, IIb, IIIa and IVa of the Periodic Table such as organic compounds of lithium, magnesium, zinc, aluminum and tin. Trialkyl aluminums, such as trimethyl aluminum, triethyl aluminum, triisobutyl aluminum, tri-n-butyl aluminum and the like are preferred activators.

The above catalyst is employed to form homopolymers of ethylene or copolymers of at least 90 weight percent ethylene and at least one $C_3$–$C_8$ linear alpha olefin. The polymerization may be carried out by any of the known processes such as solution or slurry polymerization with a hydrocarbon solvent or diluent or gas phase polymerization. A particularly effective process is the slurry process known as particle form polymerization where the ethylene polymer is produced as a particle crumb without the necessity for catalyst removal from the polymer produced as is performed in solution polymerization.

The crosslinkable ethylene polymers usefully employed in this invention have a density of above about 0.940 and a melt index between 5 and 50, preferably between 10 and 35, and most preferably between 15 and 30.

The crosslinking agents employed in this invention are the acetylenic high molecular weight diperoxy hexynes and octynes disclosed in U.S. Pat. No. 3,214,422 of Mageli et al., the entire contents of which are incorporated herein by reference. A preferred crosslinking agent is 2,5-dimethyl-2,5-di(t-butylperoxy) hexyne-3.

A flame retardant embodiment of this invention may be provided by incorporating an effective amount of a flame retardant additive composition. Useful additives include organic, heat-labile chlorine or bromine compounds such as polychlorinated paraffins, COD-dihex (the reaction product of hexachlorocyclopentadiene and 1-5-cyclooctadiene), decabromodiphenyl oxide, pentabromochlorocyclohexane, ethylene bis-tetrabromophthalimide, hexabromocyclododecane, 2,3,4,5,6-pentabromoethylbenzene, 1, 2, 3, 4, 5, 6, 7, 8, 9, 10, 11-dodecachloro-1, 4, 4a, 5a, 6, 9, 9a, 9b-octahydro-1, 4, 6, 9-dimethanodibenzofuran and 1,2 bis (2,4,6-tribromophenoxy)ethane. Optionally, and preferably, antimony trioxide is employed with any of the organic chlorine or bromine compound fire retardants to provide a combination which acts synergistically.

In addition to the crosslinking agent and, the optional flame retardant additive composition, the composition of the present invention may contain other adjuvant materials which are commonly employed in olefin polymer based rotational molding compositions. Of course, these ingredients should not adversely effect either the rotational molding or the crosslinking and should not impart undesirable characteristics to the molded article. Examples of such adjuvants include heat and/or light and/or UV stabilizers, additional stabilizers such as lead stabilizers, plasticizers, fillers, pigments, lubricants, slip agents, modifiers, crosslinking aids (monomeric coagent) and similar materials.

The following examples illustrate the practice of this invention.

EXAMPLE I

Preferred rotational molding compositions are prepared from an ethylene homopolymer prepared in a particle form polymerization process employing a solid catalyst complex which is the solid reaction product of magnesium ethylate, titanium tetrabutyrate and ethyl aluminum dichloride and an activator of triisobutyl aluminum. This homopolymer has a melt index of about 23 and a density of about 0.95 g/cm$^3$. The composition of a preferred non-flame retardant rotomolding composition prepared with this polymer is:

| | Wt. parts | Wt. percent |
|---|---|---|
| Ethylene homopolymer | 100.00 | 96.39 |
| Crosslinking agent (2,5-dimethyl-2,5-di(t-butyl-peroxy) hexyne-3) | 3.00 | 2.89 |
| Monomeric coagent (triallyl cyanurate) | 0.75 | 0.72 |

The composition of a preferred flame retardant rotomolding composition prepared with this polymer is:

| | Wt. parts | Wt. percent |
|---|---|---|
| Ethylene homopolymer | 100.00 | 66.94 |
| Crosslinking agent (2,5-dimethyl-2,5-di(t-butyl-peroxy) hexyne-3) | 2.72 | 1.82 |
| Monomeric coagent (triallyl cyanurate) | 0.68 | 0.45 |
| Brominated flame retardant additive | 37.50 | 25.10 |
| Antimony trioxide | 7.50 | 5.02 |
| Stabilizer (tetrabasic lead furmarate) | 1.00 | 0.67 |
| | 149.40 | 100.00 |

Samples of each of the above formulations were prepared (Sample No. 1—non-flame retardant; Sample No. 2—flame retardant) and evaluated for their curing properties. The evaluation procedure, known as the Monsanto ODR Curing Test, was performed as prescribed by Standard Test Method ASTM D 2084-79. The results of this evaluation are shown in Table I below.

TABLE I
CURING PROPERTIES MONSANTO ODR CURING @ 400° F.

| | Sample No. 1 | Sample No. 2 |
|---|---|---|
| Maximum Torque, $M_{HF}$, in.lbs. | 62.3 | 64.4 |
| 90% Max. Torque, $M_{H90}$, in. lbs. | 56.4 | 58.3 |
| Minimum Torque, $M_L$, in.lbs. | 3.2 | 3.3 |
| Scorch Time, $t_{s2}$, Minutes | 1.33 | 1.09 |
| 90% Cure Time, $t_{c90}$, Minutes | 4.69 | 4.32 |
| Cure Rate Index, CRI | 29.76 | 30.96 |
| Slope | 15.23 | 16.41 |

EXAMPLE II

A series of rotomolding compositions were prepared from a number of ethylene homopolymers prepared by various processes with a variety of catalysts. Each sample composition consisted of:

| | Wt. parts |
|---|---|
| Ethylene homopolymer | 100 |
| Crosslinking agent[1] | 3 |
| Monomeric Coagent[2] | 0.75 |
| | 103.75 |

[1]2,5-dimethyl-2,5-di(t-butylperoxy)hexyne-3
[2]Either trialkyl cyanurate or isocyanurate The crosslinking qualities of each sample were evaluated in the manner of Example I, viz., the Monsanto ODR Curing Test. Table II, below, presents details of each polymer and the results of the curing test.

TABLE II

| Sample No. | Polymerization Process | Catalyst[1] | Ethylene MI | Polymer Density | Monomeric Coagent[2] | Curing Test Maximum Torque $M_{HF}$, in. −16. |
|---|---|---|---|---|---|---|
| 3 | High Solids Solution | Cr Oxide | 6.0 | 0.950 | TAIC | 56.6 |
| 4 | Solution | Cr oxide | 18 | 0.955 | TAIC | 56.6 |

TABLE II-continued

| Sample No. | Polymerization Process | Catalyst[1] | Ethylene MI | Polymer Density | Monomeric Coagent[2] | Curing Test Maximum Torque $M$HF, in. −16. |
|---|---|---|---|---|---|---|
| 5 | Particle form | Mg—TiCl | 5.0 | 0.965 | TAIC | 11.6 |
| 6 | Particle form | Mg—TiCl | 9.0 | 0.950 | TAIC | 14.6 |
| 7 | Particle form | Mg—TiCl | 15 | 0.955 | TAC | 13.0 |
| 8 | Particle form | Mg—TiCl | 15 | 0.955 | TAIC | 19.0 |
| 9 | Particle form | Cr oxide | 14 | 0.955 | TAIC | No Cure |
| 10 | Particle form | Mg—Ti—AlCl | 8.0 | 0.955 | TAIC | 55.7 |
| 11 | Particle form | Mg—Ti—AlCl | 12.5 | 0.950 | TAIC | 59.4 |
| 12 | Particle form | Mg—Ti—AlCl | 22 | 0.961 | TAC | 47.0 |
| 13 | Particle form | Mg—Ti—AlCl | 23 | 0.950 | TAC | 50.0 |
| 14 | Particle form | Mg—Ti—AlCl | 23 | 0.950 | TAIC | 60.2 |

Notes
[1]Mg—TiCl = Reaction product of magnesium ethylate and titanium tetrachloride
Mg—Ti—AlCl = Reaction product of magnesium ethylate, titanium tetrabutyrate and ethyl aluminiumdichloride.
[2]TAIC = triallyl isocyanurate
TAC = triallyl cyanurate Samples No. 10-14 are compositions of this invention while Samples No. 3-9 are several prior art compositions. All of the compositions of the invention containing particle form ethylene polymer prepared with a magnesium-titanium mixed alcoholate catalyst crosslinked in a satisfactory manner substantially the same as Sample No. 3. Although these compositions of the invention did not produce as high a maximum torque as Sample No. 4 they were far superior to Samples No. 5-8 which contained a particle form ethylene polymer prepared with a magnesium ethylate-titanium tetrachloride catalyst and Sample No. 9 which contained a particle form ethylene polymer prepared with a chromium oxide catalyst.

EXAMPLE III

Rotational molded samples were prepared using a propietary designed and built rotational molding machine having a natural gas fired convection air oven for the heating cycle and a water and air cooling chamber. The molder had a single arm with two molds such that two parts could be molded with each cycle. Thus, two different materials could be molded and compared for processability and properties with each cycle. For evaluations, standard Association of Rotational Molders (ARM) hexagon box molds with 6 inch by 6 inch sides were employed. Each molding cycle employed a single molding (oven) temperature for a selected period of time at the molding temperature. Part thickness varied by the amount of powdered material charged to the mold.

Into one of the hexagon box ARM molds of the rotational molding machine, a charge of 490 grams of 35 mesh ground powder of the nonflame retardant crosslinkable molding composition of Sample 1 of Example I was placed. The other ARM mold was charged with the same quantity of 35 mesh ground powder of a non-flame retardant crosslinkable molding composition, the same as that of Sample 1 except that the ethylene homopolymer was Sample 4 of Example II. The Sample 1 composition was that of the present invention while the Sample 4 composition was of the prior art. Rotational molding was carried out for 20 minutes at 400° F. The molds were cooled to room temperature, the molded boxes were removed from the molds and were cut into six square plaques for testing. The Sample 1 molded material had a thickness of 0.081 inches and demonstrated a modified Gardner impact strength at 72° F. of 222.2 inch pounds per 0.125 inches of thickness with ductile failure. The Sample 4 molded material had a thickness of 0.085 inches but lacked good physical integrity and impact resistance.

The same quantities of each material were again respectively charged to the two molds and rotational molding was carried out at 450° F. for 20 minutes. The resultant molded boxes had wall thickness of 0.085 inches for both materials. Test plaques of the Sample 1 molded material had a modified Gardner impact strength at 72° F. of 264.7 inch pounds per 0.125 inches of thickness with ductile failure. In comparison, the modified Gardner impact strength at 72° F. of the Sample 4 molded material was 211.8 inch pounds per 0.125 inches of thickness with ductile failure.

These data indicate that the crosslinkable rotational molding composition of this invention can be molded at a 50° F. lower molding temperature than crosslinkable rotational molding compositions disclosed in the prior art.

EXAMPLE IV

Additional rotational molding evaluations were conducted in the manner of Example III.

The two hexagon box molds of Example III were charged with 450 grams of 35 mesh ground powder with the non-flame retarded material of Sample I in one mold and the Sample 4 material in the other mold. Rotational molding was for 23 minutes at 400° F. The resultant molded boxes had wall thicknesses of 0.075 inches. The Sample 1 molded product had a gel content of 86.7% and modified Gardenr impact of 33.3 ft. lbs. for brittle failure at −20° F. and 30.6 ft. lbs. for ductile failure at −40° F. In comparison, the Sample 4 material had gel content of 58.4% and modified Gardner impact of less than 8.3 ft. lbs. for brittle failure at −20° F. and less than 8.6 ft. lbs. for brittle failure at −40° F.

Repeating the rotational moldings with a 30 minutes at 400° F. cycle provided a 64.8% gel content for the Sample 4 material and a 88.2% gel content for the Sample 1 material. Sample 1 molded material had brittle impact failures with modified Gardner impacts of 31.9 ft. lbs. at −20° F. and 28.5 ft. lbs. at −40° F. Sample 4 molded material had ductile impact failures of 34.5 ft. lbs. at −20° F. and 27.8 ft. lbs. at −40° F.

These data indicate that the Sample 1 type material of the present invention requires a shorter molding cycle at a given temperature to obtain a high level of crosslinking and optimum impact resistance than the Sample 4 prior art rotomolding composition.

What is claimed is:

1. An ethylene polymer composition capable of being cross-linked during rotational molding which comprises:
   (a) a linear polymer of ethylene having a density of above about 0.94, said polymer having been prepared by particle form polymerization in the presence of a catalyst composition comprising:
      (i) the solid reaction product of (1) at least one nonhalide containing organic oxygenated compound of a metal selected from the metals of Groups Ia, IIa, IIb, IIIa, IVa, VIIb and VIII of the Periodic Table, with (2) at least one nonhalide containing organic oxygenated transition compound of a transition metal selected from the metals of Groups IVb, Vb, and VIb of the Periodic Table, and with (3) an organo aluminum halide having the general formula $AlR_nR'_{3-n}$ in which R is a hydrocarbon radical containing 1 to 20 carbon atoms, R' is a halide and n is any number such that $1 \leq n \leq 2$; and
      (ii) an organo-metallic compound selected from the organic derivatives of metals of Groups Ia, IIa, IIb, IIIa and IVa of the Periodic Table, and,
   (b) a crosslinking effective amount of an acetylenic high molecular weight diperoxy compound selected from the group consisting of hexynes having the formula

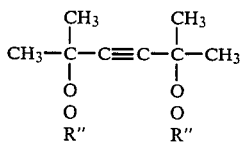

octynes having the formula

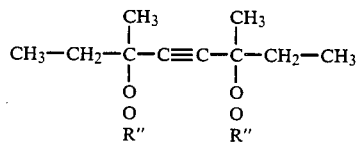

and octynes having the formula

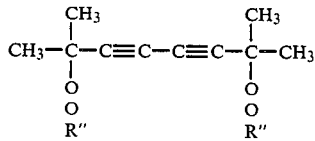

where R" is selected from the group consisting of tertiary alkyl, alkyl carbonate and benzoate.

2. A composition according to claim 1 wherein the ethylene polymer is an ethylene homopolymer.

3. A composition according to claim 1 wherein the ethylene polymer is a copolymer containing at least 90 weight percent ethylene and at least one acyclic $C_3$-$C_8$ alpha olefin.

4. A composition according to claim 1 wherein the metal of compound (1) is lithium, sodium, potassium, magnesium, calcium, zinc, boron, aluminium, silicon, manganese, iron, nickel, cobalt, or tin; and the transition metal of compound (2) is titanium, zirconium, or vanadium.

5. A composition according to claim 4 wherein the metal of compound (1) is magnesium, the transition metal of compound (2) is titanium, the organic oxygen compound and the organic oxygenated transition compound are each alkoxide, the R' of halide (3) is chloride, the R of halide (3) is alkyl, the organo-metallic compound is trialkyl aluminium and the R" of the diperoxy compound is tertiary butyl.

6. A composition according to claim 1 wherein the solid reaction product is the reaction product of magnesium ethylate, titanium tetrabutylate and ethylaluminum dichloride, the organometallic compound is triisobutyl aluminum and the diperoxy compound is 2,5-dimethyl-2,5-di(t-butylperoxy) hexyne-3.

7. A composition according to claim 1 wherein the polymer additionally contains an effective amount of a flame retardant additive composition comprising an organic, heat-labile chlorine or bromine compound.

8. A composition according to claim 7 wherein the organic heat-labile compound is ethylene bis-tetrobromophthalimide, the reaction product of hexachlorocyclopentadiene and 1,5-cyclooctadiene, 1, 2, 3, 4, 5, 6, 7, 8, 9, 10, 11, 11-dodecachloro-1, 4, 4a, 5a, 6, 9, 9a, 9b-octahydro-1, 4, 6, 9-dimethanodibenzofuran, or decabromodiphenyl oxide.

9. A composition according to claim 7 wherein the flame retardant additive composition additionally comprises antimony oxide.

10. A rotationally molded product formed from the composition of claim 1.

11. A rotationally molded product formed from the composition of claim 2.

12. A rotationally molded product formed from the composition of claim 3.

13. A rotationally molded product formed from the composition of claim 4.

14. A rotationally molded product formed from the composition of claim 5.

15. A rotationally molded product formed from the composition of claim 6.

16. A rotationally molded product formed from the composition of claim 7.

17. A rotationally molded product formed from the composition of claim 8.

18. A rotationally molded product formed from the composition of claim 9.

* * * * *

UNITED STATES PATENT AND TRADEMARK OFFICE
CERTIFICATE OF CORRECTION

PATENT NO. : 4,548,969
DATED      : October 22, 1985
INVENTOR(S) : Melvin F. Maringer and Fred K. Morgan It is certified that error appears in the above-identified patent and that said Letters Patent are hereby corrected as shown below:

On the cover page, column 1, above "Appl. No.: 497,313" insert
--- Assignee: National Distillers and Chemical Corporation,
              New York, New York ---.

Signed and Sealed this

Fourteenth Day of January 1986

[SEAL]

Attest:

DONALD J. QUIGG

Attesting Officer

Commissioner of Patents and Trademarks